United States Patent Office

2,882,254

PRESERVATION OF THE FLUIDITY OF POLYMETHYLMETHACRYLATE BY THE ADDITION OF FINELY DIVIDED SILICA

Harry Kloepfer, Frankfurt am Main, and Otto Schweitzer, Konigstein (Taunus), Germany, assignors to Deutsche Gold- und Silber-Scheideanstalt vormals Roessler, Frankfurt am Main, Germany, a corporation of Germany No Drawing. Application November 23, 1954
Serial No. 470,831

Claims priority, application Germany December 11, 1953

1 Claim. (Cl. 260—41)

The invention comprises a novel process for improving or preserving the fluidity of powdered materials by addition of small amounts of metallic oxides prepared in a certain prescribed manner insuring a very fine state of subdivision.

It is known that materials which, upon mechanical comminution or after pulverizing, tend to agglomerate owing particularly to moisture, may be treated with finely divided chemically inert substances to prevent or retard agglomeration. For this purpose, comparatively large amounts of additives are generally required to secure a reliable and lasting effect and to prevent lumping of the powdered materials in the mass. At the same time, there is no denying that the comparatively large amounts of foreign substances that must be used to prevent lumping and preserve fluidity may quite substantially alter the nature and properties of the material. For example, powdered synthetics, especially such as are intended to be fabricated into molded objects or to polymerizates such as vinyls, styrenes, and halogen-substituted polyethylenes, and other resins having equivalent characteristics are frequently difficult to handle because the powders agglomerate intensively, so that it becomes difficult to mix them in catalysts, fillers, dyes and other additives. In such cases, the lumping of these powders is probably due not so much to the action of moisture but is rather attributable to poor electrical conductivity, with resulting electrostatic charge accumulation. But if conventional additives, as for example talc or the like, are used in comparatively large quantities, these additives may produce a discoloration, undesirable especially in transparent or clear products, and in highly sensitive polymerization systems may even interfere with the polymerization itself and impair the properties of the product.

According to the process of the present invention, then, as additive to prevent cohesion or agglomeration, use is made of finely divided metal or metalloid oxides such as may be formed as aerosols by thermal decomposition of volatile metal or metalloid compounds in the gaseous phase in the presence of combustible, e.g. hydrogen-bearing and oxygen-bearing gases, and obtained as aerogels. Such oxides may, for example, be produced according to the disclosure of U.S. patent application Ser. No. 344,840, filed March 26, 1953, Wagner, in which silicon dioxide and aluminum oxide are specifically mentioned as typefying the metal or metalloid oxides having equivalent characteristics. The advantage of the procedure according to the invention consists primarily in that, unlike all other chemically inert additives, the oxides mentioned, even in very small quantities, prove surprisingly effective against the danger of lumping of the powdered resins in the mass, and will reliably make and keep powdered materials fluid even if their agglomeration is not due to the action of moisture but presumably to poor conductivity and hence to phenomena of electrostatic charge accumulation.

In general, quantities of only 0.5% by weight or less of $SiO_2$, or other metal or metalloid oxides of equivalent characteristics, will suffice, and excellent results are obtained even with addition of 0.01 to 0.1% of these very finely divided oxides, normally obtained in particle sizes of less than 50 millimicrons and even far below 25 millimicrons.

If a silicon dioxide obtained in the manner described above is used, there results the further advantage that in transparent materials, for example plastics, there is no discoloration, since the index or refraction of silicon dioxide is practically the same as that of synthetic resin. In the case of synthetic resins setting by polymerization, the additives specified have also proved successful, since owing to their small proportion the processes of polymerization are not impaired or affected, nor the properties of the finished polymerizates affected adversely.

The oxides to be used according to the invention may be incorporated with the materials either after preparation of the powders in question or alternatively as a grinding aid before or during operations of comminution.

*Example 1.*—As a test of fluidity, powdered polymethylmethacrylate was spread in a uniform layer 1.4 cm. in depth and a spatula 5 mm. wide used to draw a ditch through this layer. According to the fluidity of the material, a certain angle of repose (measured from the horizontal) is established, which is smaller the more fluid the powder and the better it is able to fill in the ditch. The results, for two powders of different origin (polymerizate I and polymerizate II) with different quantities of pyrogenically produced finely divided silica of particle size approximately 10 millimicrons added, showed the following values of angle of repose:

| Percent $SiO_2$ Added | Polymerizate I, degrees | Polymerizate II, degrees |
|---|---|---|
| 0 | 60 | 80 |
| 0.01 | 30 | |
| 0.05 | 25 | 60 |
| 0.1 | 20 | 35 |
| 0.5 | 20 | 25 |
| 1 | approx. 20 | approx. 20 |

*Example 2.*—Ground sulfur, which is highly cohesive, tends to form lumps, and therefore has poor fluidity, was intimately mixed with variously 0.1 and 0.3% of a finely divided pyrogenically produced silica of particle size approximately 10 millimicrons for some time, avoiding any further reduction of the grain size of the sulfur. Comparison of specimens with the original material showed the following results:

Original (no additive) ___ Coheres, lumpy, poor fluidity.
Original+0.1% Aerosil __ Does not cohere, good fluidity.
Original+0.3% Aerosil __ Does not cohere, very good fluidity.

Even after a storage period of ten months, thus findings remained unchanged.

Having thus disclosed our invention and described in detail illustrative examples thereof, we claim as new and desire to secure by Letters Patent:

A process of improving and preserving fluidity in a dry powdered mass of finely divided polymethylmethacrylate resin characterized by the step of adding to the powdered resin 0.01 to 1.0% by weight of $SiO_2$ of particle size approximately 10 to less than 50 millimicrons, thereby reducing the angle of repose of the powdered mixture as compared to that of the unmixed powdered resin and adapting the mixture for molding without discoloration.

(References on following page)

References Cited in the file of this patent

UNITED STATES PATENTS

| | | |
|---|---|---|
| 2,074,938 | Reed | Mar. 23, 1937 |
| 2,322,781 | Hanks | June 29, 1943 |
| 2,345,862 | Smith | Apr. 4, 1944 |
| 2,691,008 | Grim | Oct. 5, 1954 |
| 2,718,473 | Powers | Sept. 20, 1955 |
| 2,736,669 | Goebel | Feb. 28, 1956 |

FOREIGN PATENTS

| | | |
|---|---|---|
| 674,476 | Great Britain | June 25, 1952 |

OTHER REFERENCES

Hackh's Chemical Dictionary, 2nd edition, 1937.